United States Patent

Shimamune et al.

[11] Patent Number: 5,938,901
[45] Date of Patent: Aug. 17, 1999

[54] LIQUID PERMEATION-TYPE GAS-DIFFUSION ELECTRODE

[75] Inventors: Takayuki Shimamune, Tokyo; Yoshinori Nishiki, Kanagawa; Masashi Tanaka, Kanagawa; Takahiro Ashida, Kanagawa; Shuhei Wakita, Kanagawa, all of Japan

[73] Assignee: Permelec Electrode Ltd., Kanagawa, Japan

[21] Appl. No.: 08/890,667

[22] Filed: Jul. 9, 1997

[30] Foreign Application Priority Data

Jul. 11, 1996 [JP] Japan .................................. 8-201261

[51] Int. Cl.$^6$ ...................................................... C25B 11/03
[52] U.S. Cl. ............................................ 204/283; 204/252
[58] Field of Search ..................... 204/252, 282, 204/283, 284, 290 R

[56] References Cited

U.S. PATENT DOCUMENTS 5,676,808  10/1997  Nishiki et al. ...................... 204/290 R

*Primary Examiner*—Bruce F. Bell
*Attorney, Agent, or Firm*—Sughrue, Mion, Zinn, Macpeak & Seas, PLLC

[57] ABSTRACT

A gas-diffusion electrode (cathode) in contact with an ion-exchange membrane partitioning an electrolytic cell for producing caustic soda, etc., by electrolysis into an anode chamber and a cathode chamber (gas chamber). The gas-diffusion electrode is divided into plural electrode members in the horizontal direction with an interval provided between adjacent electrode members. Electrolyte guide plates may be disposed on the electrode members or between the adjacent electrode members. An aqueous caustic soda solution formed in the electrolysis smoothly is removed from the gas-diffusion electrode without clogging the electrode.

20 Claims, 2 Drawing Sheets

LIQUID PERMEATION-TYPE GAS-DIFFUSION ELECTRODE

FIELD OF THE INVENTION

The present invention relates to a gas-diffusion electrode capable of removing electrolytic product with good efficiency. More specifically, the present invention relates to a gas-diffusion cathode which is preferably used for soda electrolysis and which easily releases caustic soda formed on the surface thereof.

BACKGROUND OF THE INVENTION

The electrolytic industry represented by chloroalkali electrolysis plays an important role as a material producing industry. Although chloroalkali electrolysis has such an important role, a large amount of energy is consumed in conducting chloroalkali electrolysis. Thus, in countries where the energy cost is high, such as in Japan, it is important to reduce energy consumption. For example, in chloroalkali electrolysis, for resolving environmental problems and reducing energy consumption, the electrolysis has been converted from a mercury method to an ion-exchange membrane method employing a diaphragm. After about 25 years, an energy savings of about 40% has been achieved. However, even the energy savings achieved by employing an ion-exchange membrane method is insufficient, and the cost of an electric power which is the energy required for the ion-exchange membrane method is 50% of the total production cost. However, as far as the above-described method is used, additional electric power savings is impossible. For further reducing energy consumption, a radical change such as a change in the electrode reaction must be considered. As an example, the use of a gas diffusion electrode employed in fuel cells, etc., is the means having the highest potential for and saving electric power at present.

In a conventional anodic reaction (1) using a gas-diffusion electrode in place of a metal electrode as the anode, the anodic reaction (1) below is converted to the anodic reaction (2) as follows.

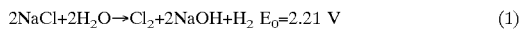

$$2NaCl+2H_2O \rightarrow Cl_2+2NaOH+H_2 \quad E_0=2.21 \text{ V} \quad (1)$$

$$2NaCl+\tfrac{1}{2}O_2+H_2O \rightarrow Cl_2+2NaOH \quad E_0=0.96 \text{ V} \quad (2)$$

That is, by converting a metal electrode to a gas-diffusion electrode, the potential is reduced from 2.21 V to 0.96 V, such that an energy savings of about 65% becomes theoretically possible. Accordingly, various investigations have been conducted for the chloroalkali electrolysis using a gas-diffusion electrode.

The gas-diffusion electrode is generally semi-hydrophobic (water-repellent) and a hydrophilic reaction layer carrying platinum, etc., on the surface thereof is connected to a hydrophobic gas-diffusion layer. Both the reaction layer and the gas-diffusion layer employ a polytetraf luoroethylene (PTFE) resin, and by utilizing the properties of the PTFE resin, both layers of the gas-diffusion electrode are formed such that a large proportion of the resin is contained in the gas-diffusion layer and the reaction layer contains a reduced proportion of the resin.

When such a gas-diffusion electrode is used for chloroalkali electrolysis, various problems occur. For example, in a high concentration aqueous caustic soda (sodium hydroxide) solution, the PTFE resin, which is a water repellent material, is liable to become hydrophilic and lose its water-repellency. To prevent the PTFE resin from losing its water repellency, a thin porous PTFE resin sheet can be applied to the foregoing gas-diffusion layer at the gas chamber side. Also, the electrolysis is carried out while supplying oxygen gas or air to the gas-diffusion electrode. However, in this case, hydrogen peroxide is partially formed as a side reaction product, and the hydrogen peroxide tends to corrode carbon which is a constituent material of the gas-diffusion electrode to form sodium carbonate. Furthermore, in an aqueous alkali solution, the foregoing sodium carbonate precipitates to sometimes clog the gas-diffusion layer and render the surface of the gas-diffusion layer hydrophilic, such that the function of the gas-diffusion electrode is deteriorated. Also, even when sodium carbonate is not formed, it is observed that by carrying a catalyst on the carbon surface, the carbon is corroded with the catalyst.

To solve the above-described problems, the selection of various kinds of carbon, the production method thereof, and control of the mixing ratio of carbon and the resin have been investigated. However, these methods cannot essentially solve the above-described problems. That is, in accordance with these methods, the corrosion of carbon can be delayed but the corrosion cannot be prevented.

Because corrosion problems do not occur when carbon is not used, various proposals have been made to use silver in place of carbon. However, a gas-diffusion electrode based on a metal is produced by a sintering method different from a gas-diffusion electrode using carbon as a constituent material, and the production method thereof is very complicated. Furthermore, it is difficult to control the respective hydrophilic and hydrophobic portions.

As a method of solving these problems and further lowering the electrolytic voltage, a method of adhering or connecting a gas-diffusion electrode to an ion-exchange membrane to substantially omit the cathode chamber, or in other words, a method of configuring the cathode chamber as a gas chamber, has been proposed. When a chloroalkali electrolysis is carried out using an electrolytic cell employing the foregoing method, caustic soda thus formed reaches the gas chamber, which is a cathode chamber, through the reaction layer and the gas-diffusion layer. Because a catholyte is not present, the foregoing method is advantageous in that it does not effect the pressure difference in the height direction of the gas chamber. Thus, when the electrolytic cell is large-sized, it is unnecessary to consider the pressure distribution. Also, the electric resistance is minimized due to the substantial absence of the catholyte, whereby the electrolytic voltage can be maintained at a minimum. On the other hand, because the permeation of caustic soda in the gas chamber direction is accelerated, the size and size distribution of the perforations in the gas-diffusion layer must be controlled. Furthermore, the caustic soda which permeates to the gas chamber side tends to clog the perforations of the gas-diffusion layer such that smooth progress of the electrolysis is hindered. This is not a problem on a laboratory scale, but in a large-sized electrolytic cell such as a practically-used electrolytic cell, the electric current distribution tends to become non-uniform due to clogging of the perforations as described above, and the electrolytic voltage is increased. That is, clogging of the perforations of the gas-diffusion layer becomes the largest obstruction for achieving large scale electrolysis.

Also, the same problems are indicated in a soda electrolysis such as a Glauber's salt electrolysis, etc., in addition to ordinary sodium chloride electrolysis.

SUMMARY OF THE INVENTION

It is therefore an object of the present invention to solve the above-described problem of the prior art, namely, the problem that a gas-diffusion electrode cannot be used at a practical level for an electrochemical reaction such as a sodium chloride electrolysis, a Glauber's salt electrolysis, etc., and to provide a liquid permeation-type gas-diffusion cathode for sodium chloride electrolysis, etc., that can be stably used for a long period of time even under severe conditions such as encountered in an alkali solution, etc.

That is, the present invention provides a liquid permeation gas-diffusion electrode in contact with an ion-exchange membrane partitioning an electrolytic cell into an anode chamber and a cathode gas chamber, said gas-diffusion electrode comprising plural beltlike electrode members arranged in a horizontal direction with an interval provided between adjacent electrode members. In a preferred embodiment, an eaves-like (overhanging) electrolyte guide plate may be provided in the intervals between adjacent electrode members or attached to the electrode members.

DETAILED DESCRIPTION OF THE INVENTION

Figure 1:
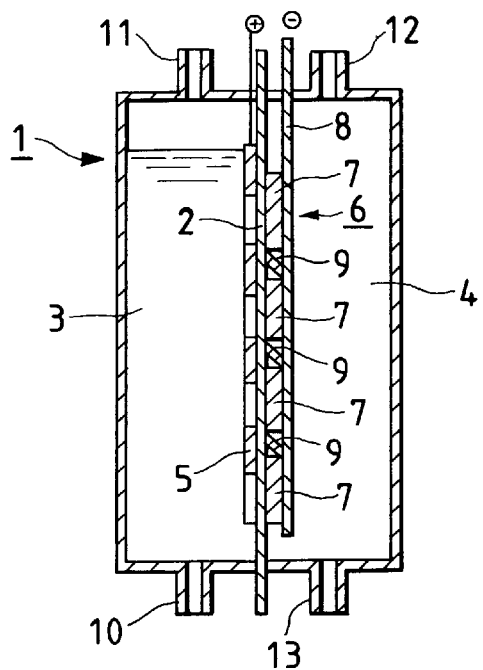
FIG. 1 is a schematic cross-sectional view showing an example of an electrolytic cell for soda electrolysis using the gas-diffusion cathode of the present invention.

The present invention is described in detail below.

The present invention provides a gas-diffusion electrode, in particular, a gas-diffusion cathode which can quickly release caustic soda, etc., permeating the cathode gas chamber when used in an industrial electrolysis such as a sodium chloride electrolysis, a Glauber's salt electrolysis, etc., from the surface of the gas-diffusion cathode, to thereby restrain instability in electrolytic conditions due to inadequate gas supply and conversion to a hydrophilic property. As a result, the gas-diffusion cathode can be used to carry out a soda electrolysis, etc., under stable conditions for a long period of time.

As described above, in an electrolysis using a gas-diffusion cathode, such as a soda electrolysis, with progress of the electrolysis, an aqueous caustic soda solution which is an electrolyte permeates to the back surface of the gas-diffusion cathode. The solution contains sodium ion together with water which has permeated through the ion-exchange membrane from the cathode chamber side and hydroxide ion supplied from the gas-diffusion cathode. If the aqueous caustic soda solution is not quickly removed from the surface of the gas-diffusion cathode, the perforations of the gas-diffusion cathode are clogged to obstruct the gas supply, such that stable electrolytic operation cannot be continued.

It is considered that the release of the caustic soda solution from the surface of the gas-diffusion cathode can be smoothly carried out by making the surface thereof water repellent, that is, by reducing the wetting property of the gas-diffusion cathode.

However, by only simply making the surface of the gas-diffusion cathode water repellent, a reduction in the wetting property of the surface can be attained. However, the solution which reaches the gas chamber side by permeating through the gas-diffusion layer remains on the surface of the gas-diffusion layer as water drops, and the water drops do not release from the surface without becoming considerably larger. In particular, the tendency is remarkable when using a large-size electrolytic cell, and a large amount of aqueous caustic soda solution is retained at the lower portion of the gas-diffusion cathode, that is, the lower side thereof along the gravity direction. This is because an aqueous caustic soda solution is added from above, thereby the apparent overvoltage is increased and then the cell voltage is increased. In a laboratory scale electrode of an electrolytic cell having a height of from about 3 to 20 cm, an increase in cell voltage, that is, a voltage difference in the height direction of the electrode, is hardly observed. On the other hand, in an electrolytic cell having an electrode having a height taller than about 20 cm, electrolysis proceeds at a sufficiently low voltage at the upper portion of the electrode where the solution tends to be removed therefrom as described above. However, at the lower portion of the electrode which tends to be covered with an aqueous caustic solution, etc., thus formed, an increase in voltage is observed.

The present inventors have found that the difference in cell voltage in the height direction of an electrode, that is, the increase in voltage at the lower portion of the electrode of a relatively large electrolytic cell, in other words an electrolytic cell having a large electrode, is suppressed when the electrode is divided in the horizontal direction to form beltlike electrode members each having almost the same vertical width as the vertical width of the electrode of a relatively small electrolytic cell. Also, when the divided electrode members are arranged in an interval with one another in the vertical direction, even in a large-sized electrolytic cell, the electrolysis can proceed without almost no increase in voltage, to thereby achieve the present invention.

The vertical width of the beltlike electrode members of the present invention depends upon various electrolytic conditions. Generally, the beltlike electrode members have a vertical width of from 2 to 40 cm.

If the vertical width thereof is less than 2 cm, the preparation of the electrode becomes complicated. Also, the ratio of the intervals between the respective electrode members relative to the whole gas-diffusion electrode becomes too large, and thereby substantially reduces the electrolytic area. Also, if the vertical width thereof is longer than 20 cm, the portion covered with an electrolyte in the lower portion of the electrode member in the case of an ordinary large-sized electrolytic cell become large. Thus, a sufficiently low voltage sometimes is not obtained.

There is no particular restriction on the interval between the vertically adjacent electrode members. The interval may be appropriately selected in a range such that the reduction of electrolytic area is restrained and the release of electrolyte is smoothly carried out. For example, the interval may be from 1 to 5 mm.

When electrolysis is carried out using an electrolytic cell having plural electrode members, an electrolyte such as an aqueous caustic soda, etc., permeates onto the surface of a gas-diffusion cathode. For example, the aqueous caustic soda flows down the surface of each electrode member by gravity and reaches the lower end of each electrode member. Due to a space (interval) provided between the electrode members, the electrolyte is prevented from flowing down to an electrode member disposed under the foregoing electrode member, the electrolyte moves along the space extending in the horizontal direction and flows down to the bottom of the electrolytic cell from both end portions of the space or moves to a feeder, etc., connected to the foregoing electrode member from the space. Thus, the electrolyte is removed from the electrode members, that is, the surface of the gas-diffusion electrode.

In addition, the above-described electrode members do not necessarily continue over the whole horizontal direction, and may be divided into plural parts in the horizontal direction. When the electrode members are divided in the horizontal direction, the foregoing electrolyte moving along the above-described space in the horizontal direction flows down from each space formed by the division. Thus, the electrolyte is easily released from the electrode members.

Also, to more smoothly carry out the release of the electrolyte, at least one eaves-like (overhanging) electrolyte guide plate may be attached to the electrode member or may be disposed between the vertically adjacent electrode members such that the guide plate is downwardly inclined to the side of the gas-diffusion electrode opposite the ion-exchange membrane.

The electrolyte guide plate prevents the electrolyte from remaining on the surface of the electrode members by guiding electrolyte in the lower portion of each electrode member to the outside direction from the surface direction of the electrode member or from the surface portion. When the feed to the electrode members is considered, the electrolyte guide plate is preferably provided in a space between the adjacent electrode members. However, when removal of the electrolyte on the surface of the electrode member is important, it is better to equip the electrolyte guide plate to a side surface of the lower end of each electrode member inclining to the outside. In that case, the electrolyte flowing down along each electrode member contacts the electrolyte guide plate and flows down along the inclined electrolyte guide plate. Because a bottom plate of the electrolytic cell is under the tip of the electrolyte guide plate, the electrolyte is certainly released and removed from the electrode member, that is, the gas-diffusion electrode.

The electrolyte guide plates release the electrolyte from the surface of the gas-diffusion electrode and the width thereof is from about 1 to 3 mm. Also, there is no restriction on the method of equipping each guide plate if the guide plates can be fixed to the portions described above. For example, the guide plates may be attached to the surface of the gas-diffusion electrode or to the surface of the feeders using an adhesive paste.

The space between the electrode members cannot be utilized for electrolysis. However, the reduction of electrolysis is sufficiently compensated by an increase in the electrolytic efficiency.

There is no particular restriction on the quality of material used for the electrolyte guide plates so long as the material does not adversely influence the ion-exchange membrane through the gas-diffusion electrode. Preferably, the electrolyte guide plates are prepared by molding a corrosion resistant resin having excellent workability, such as a fluorine resin, polyethylene, polypropylene, etc. The electrolyte guide plates may also be prepared by molding a metal. In this case, to mitigate any adverse influence on the ion-exchange resin, those portions of the guide plates which contact the ion-exchange membrane directly or through the gas-diffusion electrode are preferably enlarged, so as to reduce the pressure applied to the ion-exchange membrane.

An electrode structural material is prepared by laminating the gas-diffusion electrode, such as a gas-diffusion cathode having the above described construction and other constituent members, in the order of an anode-an ion-exchange membrane-the gas-diffusion cathode-a cathode feeder, followed by pressing from both sides. When an electric current is passed through both electrodes in an electrolytic cell incorporating the electrode structural material while supplying an aqueous sodium chloride solution to the anode chamber and an oxygen-containing gas to the cathode chamber, cathode products such as caustic soda, etc., are formed at the gas-diffusion cathode. The electrolyte such as the aqueous caustic soda solution, etc., reaches the surface of the foregoing gas-diffusion cathode, that is, the surfaces of the electrode members corresponding to the electrode which are not substantially covered with the electrolyte. The electrolyte is easily released and removed from the electrode members. Thus, the electrode members are not covered with the electrolyte thus formed. As a result, the supply of the raw material gas and discharge of the produced gases can be smoothly carried out and the electrolysis can be stably continued at a low voltage.

The present invention is described by reference to the accompanying drawings below.

Figure 2:
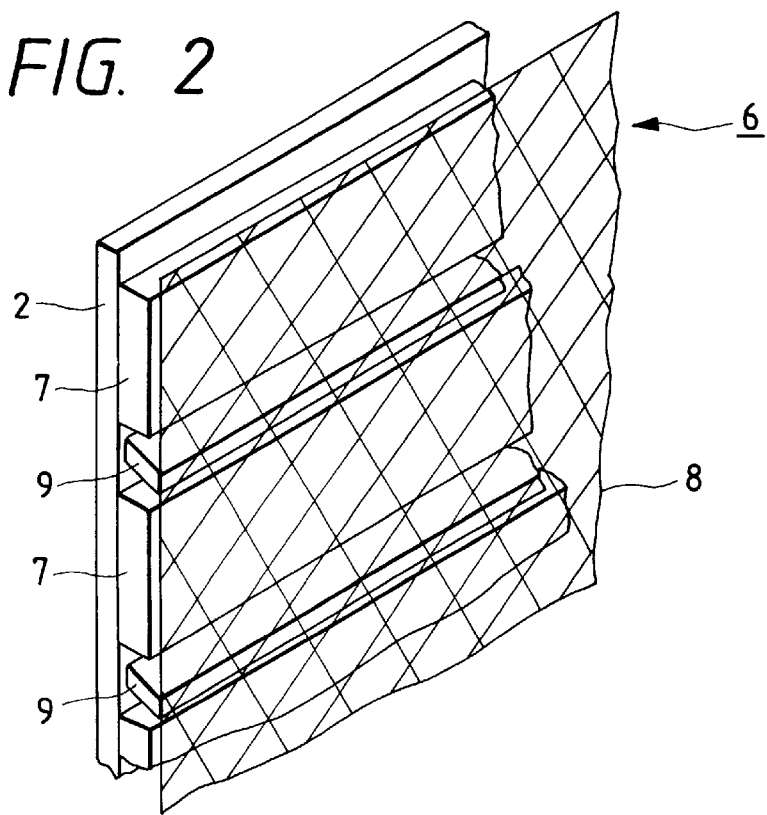
FIG. 2 is an enlarged slant view of the surface of the gas-diffusion cathode of FIG. 1 on the gas chamber side.

FIG. 1 is a schematic cross-sectional view showing an embodiment of a two-chamber-type electrolytic cell for soda electrolysis having incorporated therein the gas-diffusion cathode of the present invention. FIG. 2 is an enlarge slant view showing the surface of the gas-diffusion cathode of FIG. 1 on the gas chamber side.

As shown in FIG. 1, an electrolytic cell 1 is partitioned by an ion-exchange membrane into an anode chamber 3 and a cathode chamber (a gas chamber), a mesh-form insoluble anode 5 is adhered onto the above-described ion-exchange membrane 2 at the anode chamber side 3, and a gas-diffusion cathode 6 is adhered to the ion-exchange membrane at the cathode chamber side 4. The gas-diffusion cathode 6 is divided into four beltlike electrode members 7 in the perpendicular direction and an interval (space) is provided between the adjacent electrode members.

A mesh-form collector 8 contacts the surface of the electrode members 7 to supply electric current to the electrode members. Onto the collector 8 electrolyte guide plates 9 are connected in an interval which is the same as the interval of the electrode members 7 at an upward slant away from collector 8. By contacting the collector 8 with the surfaces of the electrode members 7, the electrolyte guide plates 9 are inserted into the spaces between the adjacent electrode members 7. A general range for the degree of incline of the electrolyte guide plates is 5 to 80° C.

In addition, 10 is an anolyte inlet formed at the bottom plate of the anode chamber, 11 is an outlet of the anolyte and a gas formed at the upper plate of the anode chamber, 12 is an oxygen-containing gas inlet formed at the upper plate of the cathode chamber, and 13 is an outlet for aqueous caustic soda solution formed at the bottom plate of the cathode chamber.

When an electric current is passed between electrodes 5 and 6 while supplying an anolyte such as, for example, an aqueous sodium chloride solution to the anode chamber 3 and an oxygen-containing gas to the cathode chamber 4 of the electrolytic cell 1, caustic soda is formed at the surface of the ion-exchange membrane 2 at the cathode chamber side. The caustic soda permeates the electrode members 7 constituting the gas-diffusion cathode as an aqueous solution thereof, and reaches the surface of the gas-diffusion cathode at the cathode chamber side.

The aqueous caustic soda solution reaching the surface of the cathode flows down along the surface of the foregoing electrode member 7 by gravity, reaches the foregoing electrolyte guide plate 9, flows down slantwise along the surface of the guide plate, falls onto the lower adjacent guide plate 9, moves along the horizontal direction of the plate and falls down from the end portions of both sides of the lower plate 9, or permeates to the back surface of the collector 8. In any case, the aqueous caustic soda solution is released from the surface of the gas-diffusion cathode 6.

When the above-described electrolyte guide plates 9 are not present, the aqueous caustic soda solution flowing down along the surface of the electrode member 7 reaches the lower end of the electrode member, falls onto another electrode member 7 below the foregoing electrode member, and reaches the upper surface of the lower electrode member 7. Thereafter, the aqueous caustic soda solution moves to the width direction, flows down from the end portions of both sides of the foregoing electrode member 7, and is released from the surface of the gas-diffusion cathode 6. Accordingly, the aqueous caustic soda solution thus formed is relatively quickly and surely released from the gas-diffusion cathode 6. Consequently, the solution does not remain on the surface of the electrode to hinder the gas supply, and almost the whole surface of the electrodes can be effectively used for the electrolysis.

FIG. 1 shows a two-chamber-type electrolytic cell for soda electrolysis. However, the present invention can be also applied to a three-chamber-type electrolytic cell for soda electrolysis, etc.

Figure 3:
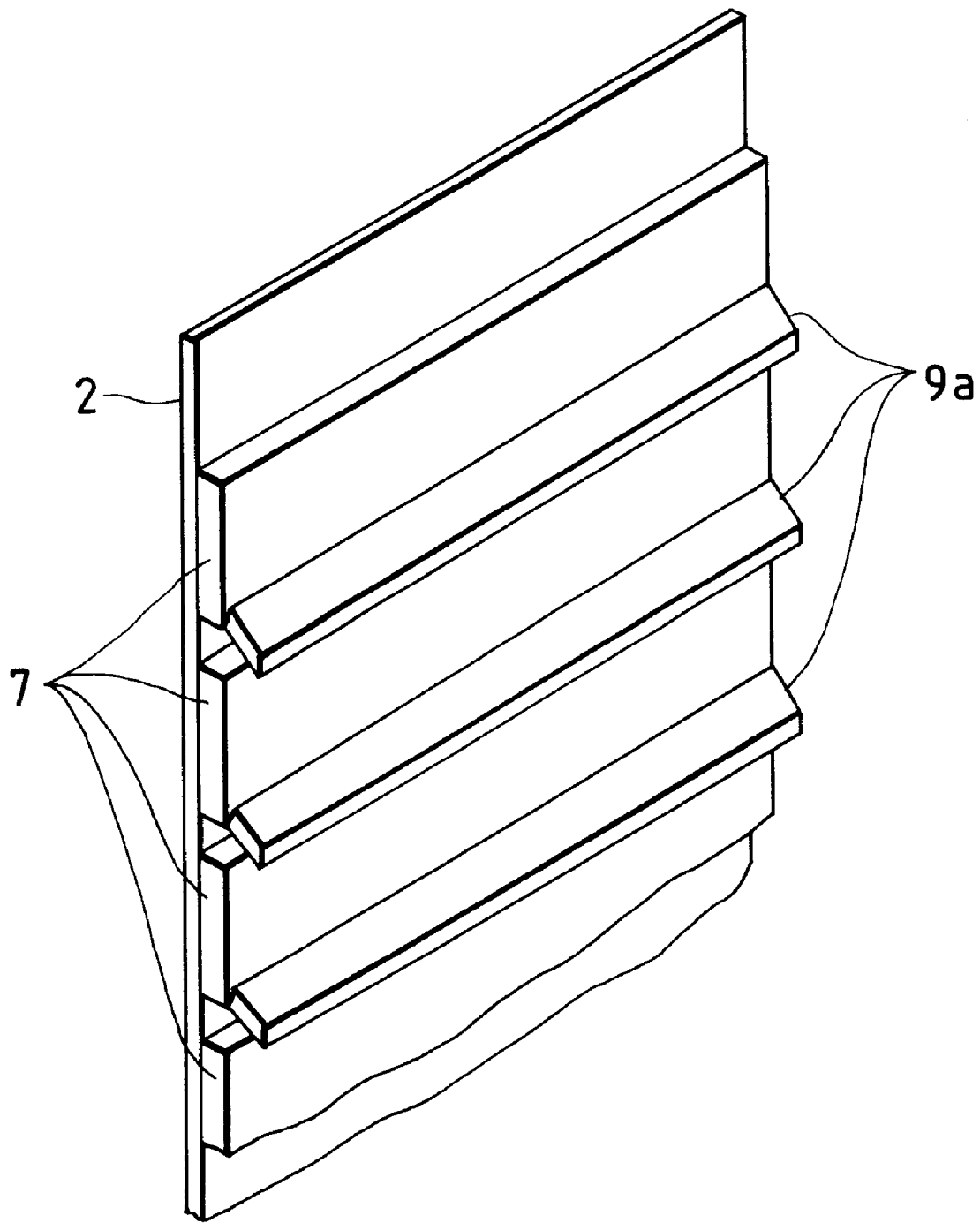
FIG. 3 is an enlarged slant view showing yet another embodiment of the surface of the gas-diffusion cathode of the present invention on the gas chamber side.

FIG. 3 is an enlarged slant view of another embodiment of the surface of the gas-diffusion cathode of the present invention on the gas chamber side.

In the embodiment shown in FIG. 3, the electrolyte guide plates 9a are each connected to a side surface of the lower end of the electrode members 7 at a downward slant. In this embodiment, an aqueous caustic soda solution permeating the electrode members 7 and reaching the surface thereof at the cathode chamber flows down along the surface of the above-described electrode member 7, reaches the above-described electrolyte guide plate 9, flows down slantwise on the surface, and falls from the lower end thereof. There are no electrode elements under the lower end of the electrolyte guide plate 9. Thus the solution falls to the bottom plate of the electrolytic cell and is surely released and removed from the gas-diffusion cathode 6. A general range for the incline of the electrolyte guide plates is 5 to 80° C.

In addition, in the above embodiment, it is difficult to supply electric current to all of the electrode members 7 by a single plane collector. Thus, a power supply method of inserting a saw-toothed shape collector into the electrode members from the side direction thereof, etc., is preferably employed.

The gas-diffusion electrode of the present invention and electrolysis using the same are described below in reference to the following Examples, but the invention should not be construed as being limited thereto.

EXAMPLE 1

A nickel foam thick-plated with silver and having an apparent thickness of 5 mm was crushed by a press to a thickness of 1 mm to form a gas-diffusion electrode base material. A paste formed by adding 5% dextrin as a binder to carbonyl nickel followed by kneading with water was filled in the inside of the base material described above from both surfaces thereof and coated on the surfaces thereof. After drying at 60° C., the base material was sintered in an electric furnace of 450° C. for 15 minutes in a hydrogen gas stream. The sintered base material was immersed in a nonelectrolytic plating bath of silver to apply a silver plating to the surfaces thereof.

An aqueous suspension of a PTFE resin, J30 (trade name, made by E.I. Du Pont de Nemours and Company), diluted twice with deionized water, was coated on the foregoing plated base material such that the diluted suspension was applied to both surfaces of the base material and the surfaces of the perforations thereof. After drying, the base material thus coated was sintered at 350° C. for 15 minutes.

One surface of the base material was coated with a suspension obtained by suspending a silver powder having an average particle size of 0.2 μm in an aqueous silver nitrate solution. After drying, the base material was sintered in an hydrogen gas atmosphere at 250° C. for 15 minutes to form an electrode member having an electrode catalyst on one surface thereof.

Five beltlike electrode members each having a width of 5 cm were prepared as described above. The beltlike electrode members thus prepared were arranged in parallel with an interval of 1 mm on the surface of a mesh kneaded with a copper wire thick-plated with silver, the surface of which was coated with the aqueous suspension of the PTFE resin, J30 described above and which functioned as a collector. The structure was such that the surfaces of the electrode members not coated with the foregoing silver nitrate solution faced the surface of the mesh. After semi-fixing, the assembly was sintered at 350° C. to fix the electrode members.

The electrode catalyst side surfaces of the plural electrode members fixed to the collector were adhered to the surface of an ion-exchange membrane, Naphion 961 (trade name, made by E.I. Du Pont de Nemours and Company). Then, an insoluble anode prepared by covering a titanium mesh having a thickness of 0.5 mm with a mixture of ruthenium oxide and tantalum oxide was adhered to the side of the ion-exchange membrane opposite the foregoing electrode members. The electrodes were then fixed by applying pressure between the above-described cathode feeder and the insoluble anode. The assembly was disposed in a two-chamber-type electrolytic cell having a height of 25 cm and a width of 20 cm to construct an electrolytic cell for soda electrolysis.

While supplying 180 g/liter of an aqueous sodium chloride solution to the anode chamber and an oxygen gas saturated with water to the cathode chamber in an amount of 120% of the theoretical amount, electrolysis was carried out at a temperature of 90° C. and a current density of 30 A/dm$^2$.

The initial cell voltage was 2.11 V and an aqueous caustic soda solution having a concentration of 33% was obtained from the cathode chamber. Even after 50 days, the voltage and other performance characteristics were unchanged. Also, when the surface of the gas-diffusion cathode was observed during electrolysis, the aqueous caustic soda solution permeating to the gas-diffusion cathode side flowed in the horizontal direction along the space (interval) between the adjacent electrode members.

COMPARATIVE EXAMPLE 1

Caustic soda was electrolytically produced under the same conditions as in Example 1, except that the gas-diffusion cathode was not divided into electrode members. Rather, the gas-diffusion electrode comprised a single rectangular electrode having a height of 25 cm and a width of 20 cm.

The initial cell voltage was 2.4 V, but after 30 minutes the voltage increased to 2.8 V. When the electric current distribution in the vertical direction of the surface of the gas-diffusion cathode was measured, the current density at a portion 10 cm from the upper end of the electrolytic cell was from 40 to 50 A/dm$^2$, while the electric current at a portion 5 cm from the lower end of the electrolytic cell was almost zero and the generation of a small amount of hydrogen was confirmed. Thus, continuation of the electrolysis was considered to be dangerous and the electrolysis was stopped. In addition, the solution on the surface of the gas-diffusion cathode flowed down along the entire surface of the electrode. At the lowermost portion, the whole surface of the electrode was completely covered with solution which had flowed down the electrode.

EXAMPLE 2

Caustic soda was electrolytically produced under the same conditions as in Example 1, except that the width of the electrode members was varied in the range of from 5 to 20 cm.

The values of the initial cell voltages and the cell voltages after one hour of operation are shown in Table 1 below.

As shown in Table 1, when the width of the electrode members was in the range of from 5 to 15 cm, the cell voltage was stable, hydrogen was not generated, and stable electrolysis could be continued. When the width of the electrode members was 17 cm or 20 cm the initial cell voltage was acceptable. However, one hour after operation, the voltage began to increase and the generation of hydrogen was observed although the amount thereof was slight.

TABLE 1

| Width | 5 cm | 7 cm | 10 cm | 15 cm | 17 cm | 20 cm |
|---|---|---|---|---|---|---|
| (A) | 2.12V | 2.15V | 2.20V | 2.38V | 2.40V | 2.40V |
| (B) | 2.12V | 2.16V | 2.24V | 2.45V | >2.80V | >2.80V |
| (C) | none | none | none | none | slight | slight |

Width: Width of Electrode Member
(A): Initial Cell Voltage
(B): Cell Voltage After One Hour
(C): Hydrogen Generation.

EXAMPLE 3

Caustic soda was electrolytically produced using the same electrolytic cell and under the same conditions as in Example 1, except that the width of the electrode members was 10 cm, and the interval between the adjacent electrode members was 3 mm. A netting mesh thick-plated with silver having rectangular meshes each having a diameter of 1 mm was used as a collector, eaves-form (overhanging) electrolyte guide plates each having a width of 5 mm were provided on the surface of the collector upwardly slanted with an interval of 10 cm, electrolyte guide plates of the netting mesh were inserted in the intervals between the electrode members, and the netting mesh was fixed to the surface of the electrode members as in Example 1.

The initial cell voltage was 2.20 V, which was same as the initial voltage in the case of using electrode members having the same width in Example 2. However, one hour after operation, the cell voltage was maintained at 2.20 V and even after 10 days the cell voltage was constant. It is considered that these results were obtained because the electrolyte was released from the electrolyte guide plates.

As described above, the gas-diffusion electrode of the present invention is a liquid permeation-type gas-diffusion electrode in contact with an ion-exchange membrane partitioning an electrolytic cell into an anode chamber and a cathode gas chamber. The gas-diffusion electrode comprises plural beltlike electrode members arranged in the horizontal direction with an interval provided between adjacent electrode members.

Because the gas-diffusion electrode is divided into plural electrode members in the horizontal direction, having a size such that the surface thereof is not substantially covered with an electrolyte formed in the electrolysis, aqueous caustic soda solution, etc., does not remain on the surfaces of the electrode members and does not cover the electrode members. The spaces of the electrode dividing the adjacent electrode members cannot be used for electrolysis. However, the retention of electrolyte which would otherwise obstruct the gas supply by covering the whole surface of the electrode if the spaces were not present is restrained, and the aqueous caustic soda solution formed in the electrolysis can be immediately removed from the cathode chamber side. Thus, gas supply and liquid removal can be smoothly carried out and the cell voltage is lowered. That is, in the present invention, the increase in efficiency of the electrolysis sufficiently compensates for the reduction in the effective electrode surface due to division of the gas-diffusion electrode. Furthermore, even when the amount of the electrolyte formed is increased by increasing the current density, the electrode members are hardly clogged.

In the case of large-sizing an electrolytic cell, the release of solution from the surface of the gas-diffusion cathode described above is an important performance parameter, and in the past has been a limiting factor in large-sizing an electrolytic cell. According to the present invention, when the size of the electrolytic cell is increased by dividing the gas-diffusion electrode in the horizontal direction, the large amount of solution thus formed can be smoothly released. Thus, the present invention easily allows for scaling up the size of an electrolytic cell.

Also, by disposing eaves-form (overhanging) electrolyte guide plates directly on the electrode members or in the spaces between adjacent electrode members, the electrolyte on the surfaces of the electrode members is guided by the above-described electrolyte guide plates and is more smoothly released from the surfaces of the electrode members.

The vertical width of the electrode members preferably is from 2 to 20 cm. Namely, if the width is less than 2 cm, the production of the gas-diffusion electrode takes too much time and there is a large reduction in the effective electrode area. On the other hand, if the width is longer than 20 cm, the voltage is lowered when the electrode members are covered with the electrolyte.

While the invention has been described in detail and with reference to specific embodiments thereof, it will be apparent to one skilled in the art that various changes and modifications can be made therein without departing from the spirit and scope thereof.

What is claimed is:

1. A gas-diffusion electrode in contact with an ion-exchange membrane partitioning an electrolytic cell into an anode chamber and a cathode chamber, said gas-diffusion electrode comprising plural belt-shaped electrode members arranged in the horizontal direction with an interval provided between adjacent electrode members.

2. The gas-diffusion electrode of claim 1, wherein the electrode members have a vertical width of from 2 to 40 cm.

3. The gas-diffusion electrode of claim 1, wherein said interval is from 1 to 5 mm.

4. A gas-diffusion electrode in contact with an ion-exchange membrane partitioning an electrolytic cell into an anode chamber and a cathode chamber, said gas-diffusion electrode comprising plural belt-shaped electrode members arranged in the horizontal direction with an interval provided between adjacent electrode members and an electrolyte guide plate provided in the intervals between adjacent electrode members.

5. The gas-diffusion electrode of claim 4, wherein the electrolyte guide plate has a width of from 1 to 3 mm.

6. The gas-diffusion electrode of claim 4, wherein the electrolyte guide plate is downwardly inclined to the side of the gas-diffusion electrode opposite the ion-exchange membrane.

7. The gas-diffusion electrode of claim 4, further comprising a collector disposed on the side of the gas-diffusion electrode opposite the ion-exchange membrane, said electrolyte guide plate is attached to the collector in an interval which is the same as the interval between the electrode members, and the electrolyte guide plate is inserted into the space between adjacent electrode members.

8. The gas-diffusion electrode of claim 7, wherein the electrolyte guide plate is downwardly inclined to the side of the gas-diffusion electrode opposite the ion-exchange membrane.

9. The gas-diffusion electrode of claim 4, wherein the electrode members have a vertical width of from 2 to 40 cm.

10. The gas-diffusion electrode of claim 4, wherein said interval is from 1 to 5 mm.

11. A gas-diffusion electrode in contact with an ion-exchange membrane partitioning an electrolytic cell into an anode chamber and a cathode chamber, said gas-diffusion electrode comprising plural belt-shaped electrode members arranged in the horizontal direction with an interval provided between adjacent members and an electrolyte guide plate attached to said electrode members.

12. The gas-diffusion electrode of claim 11, wherein said electrolyte guide plate is attached to a lower end portion of said electrode members and is downwardly inclined to the side of the gas-diffusion electrode opposite the ion-exchange membrane.

13. The gas-diffusion electrode of claim 11, wherein said electrolyte guide plate is attached to a side surface of a lower end portion of said electrode members and is downwardly inclined to the side of the gas-diffusion electrode opposite the ion-exchange membrane.

14. The gas-diffusion electrode of claim 11, wherein the electrolyte guide plate has a width of from 1 to 3 mm.

15. The gas-diffusion electrode of claim 11, wherein the electrode members have a vertical width of from 2 to 40 cm.

16. The gas-diffusion electrode of claim 11, wherein said interval is from 1 to 5 mm.

17. An electrolytic cell comprising an ion-exchange membrane partitioning the electrolytic cell into an anode chamber and a cathode gas chamber, and a gas-diffusion cathode disposed in said cathode gas chamber having a first surface in contact with said ion-exchange membrane and an opposing second surface facing the cathode gas chamber comprising plural belt-shaped electrode members arranged in the horizontal direction with an interval provided between adjacent electrode members.

18. The electrolytic cell of claim 17, further comprising an electrolyte guide plate provided in the intervals between adjacent electrode members and downwardly inclined to the side of the gas-diffusion electrode opposite the ion-exchange membrane.

19. The electrolytic cell of claim 17, further comprising an electrolyte guide plate attached to a lower end portion of said electrode members and downwardly inclined to the side of the gas-diffusion electrode opposite the ion-exchange membrane.

20. The electrolytic cell of claim 17, wherein said electrode members are divided into plural parts in the horizontal direction.

* * * * *